Patented Dec. 26, 1950

UNITED STATES PATENT OFFICE 2,535,968

HETEROCYCLIC GUANAMINES

Jack Theo Thurston, Cos Cob, and Donald William Kaiser, Stamford, Conn., assignors to American Cyanamid Company, New York, N. Y., a corporation of Maine No Drawing. Application April 13, 1945, Serial No. 588,256

2 Claims. (Cl. 260—249.9)

This invention relates to substituted guanamines, and in particular to guanamines having a heterocyclic substituent joined to the 2-carbon atom of the triazine ring through a carbon to carbon linkage. The instant application constitutes a continuation in part of our co-pending application for United States Letters Patent, Serial No. 409,124, now abandoned, filed August 30, 1941.

In the past, a number of guanamines have been known in which the 2-carbon atom of the triazine ring is either unsubstituted or is substituted by such simple groups as a methyl or a phenyl radical. These compounds may be generically represented by the formula

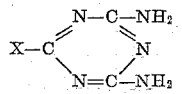

in which X represents the substituent on the 2-carbon atom. According to the present invention, guanamines are prepared in which X represents a substituent group comprising, at least in part, a 5 or 6 membered heterocyclic ring and which contains a conjugated system of double bonds.

These new heterocyclic guanamines are particularly useful as starting materials to form pharmaceuticals, textile and paper testing compositions and by condensation with an aldehyde, such as formaldehyde, to form resinous polymers thereof. The resins have the characteristic properties imparted to them by the nature of the heterocyclic substituent in the 2-position. For example, many of the heterocyclic substituents are coupling components for azo dyes and it thereby becomes possible to produce self-colored guanamine resins since they form part of an azo dye molecule.

In the past, some guanamines have been prepared by reacting biguanide with a suitable acid halide. This process theoretically could be used to prepare the heterocyclic products of the present invention. Unfortunately, the process is subject to many procedural disadvantages. Notably, the yields are poor, in the neighborhood of 10–15%, and the products of such a reaction are always mixtures. Many of these mixtures are especially difficult to separate into desirable and undesirable components. As a result, this process was never considered particularly useful and was not extensively used to extend the field until the improved procedure of carrying the reaction out in the presence of concentrated aqueous alkali and an equal volume of non-hydroxylic organic solvent was discovered by Nagy as set forth in his copending application for U. S. Letters Patent, Serial No. 409,151, now Patent No. 2,446,980, August 10, 1948, filed August 30, 1941.

The preparation of formoguanamine by reacting formic ester and biguanide also was known. This reaction proceeds easily and in good yield simply upon dissolving the reactants in a hydroxylic organic solvent such as methanol, a glycol or the like. However, attempts to apply this process to esters of higher molecular weight aliphatic acids proved it is not of general application. When esters of the longer chain fatty acids are tried, it is found that the activity decreases very rapidly, as the length of the carbon chain increases. Esters of acetic and propionic acid, for example, are not nearly as reactive as formic ester. When the fatty acid contains five to six or more carbon atoms the reaction becomes so slow as to be impractical. This reaction therefore was also considered impractical for general use and was not used in the past except to prepare formoguanamine.

It has now been found, however, that the lower alkyl esters of certain heterocyclic ring compounds containing a carboxylic group are substantially as reactive with a biguanide to form 2-substituted guanamines as are formic and acetic acid esters. Unexpectedly, therefore, it thus becomes possible to use the biguanide-ester reaction to extend the known field of guanamines by preparing the novel guanamines of the present invention. These products are readily obtained by a simple synthesis, in good yield and without being subject to excessive purification problems.

The most important guanamines for practical purposes are those in which the amino group in the 4- and/or 6-position of the triazine ring is not substituted, since at least one free amino group is necessary in the formation of resins with aldehydes. Guanamines unsubstituted in either the 4- or 6-amino group are preferred and can be readily prepared from biguanide which is comparatively economical and readily made. However, if so desired the N-substituted compounds can be prepared by the same synthesis using a correspondingly substituted biguanide such as phenyl biguanide, allyl biguanide, methyl biguanide, and the like.

Some esters tend to be slow in reacting, particularly with certain substituted biguanides. In such cases it is generally desirable to carry out the process in the presence of a metal alkoxide as a condensing agent. While the use of metal alkoxides is not essential in the reaction with the esters of the heterocyclic carboxylic acids of this invention, the process generally will proceed more rapidly to completion in their presence. Among the metal alkoxides which have been found to be effective for the purpose are sodium methoxide, potassium ethoxide, aluminum isopropoxide, and the like.

Biguanide and/or substituted biguanides are solids and in order to effect reaction, it is desirable to dissolve the biguanide in a suitable solvent. Contrary to the experience of Nagy in the above identified copending application it has been found that a hydroxylic organic solvent, i. e., one having an alcoholic —OH group, is the most desirable. For this purpose, we prefer to use methanol as this solvent is cheap, relatively inert in reaction, and is an excellent solvent for biguanide. However, other solvents can be used, as for example, ethanol, ethers of ethylene glycols, phenols, and the like.

The various heterocyclic radicals which may be attached to the 2-carbon atom of the 4,6-diamino-1,3,5-triazine according to the present invention contain certain distinguishing characteristics. First, they all preferably contain only one form of hetero atom, i. e., ring structures containing no different hetero atoms. There may be, however, a plurality of hetero atoms, i. e., two oxygen or two nitrogens in the heterocyclic ring. Secondly, the heterocyclic radicals or the group containing the heterocyclic ring which comprises the 2-substituent of the present invention contains a conjugated system of carbon-to-carbon double bonds and in some cases also contains double bonded carbon-to-nitrogen atoms or nitrogen-to-nitrogen atoms. Thirdly, these conjugated systems are contained in a 5 or 6 membered ring structure. Typical illustrative carboxylic acids include for example:

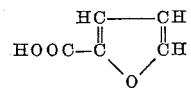
Furoic acid

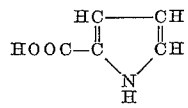
Pyrrole-2-carboxylic acid

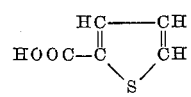
Thiophene-2-carboxylic acid

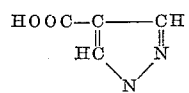
Pyrazole-4-carboxylic acid

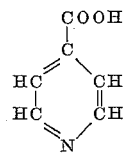
Pyridine-4-carboxylic acid

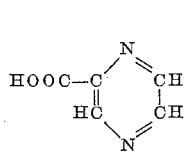
Pyrazine carboxylic acid

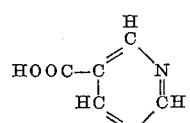
Pyrimidine-5-carboxylic acid

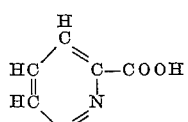
Pyridazine-3-carboxylic acid

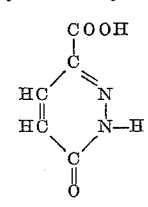
Pyridazone-6- carboxylic acid

The invention will be discussed in conjunction with the following examples which are intended as illustrative only and not by way of limitation. All parts are by weight unless otherwise noted.

EXAMPLE 1

*Furoguanamine*

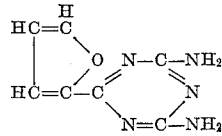

Sixty parts of technical grade biguanide were dissolved in 180 parts of methanol by warming, and the solution was clarified by filtration to remove insoluble impurities associated with the biguanide. 110 parts of ethyl furoate were dissolved in 96 parts of methanol and added to the biguanide solution at room temperature. Reaction started immediately, producing a dark brown solution which became progressively lighter as the guanamine precipitated. The crystallization of the guanamine took considerable time, and the mixture was allowed to stand until precipitation was substantially complete, about 24 hours for these quantities. The guanamine was then separated by filtration, washed with methanol and dried in air. The filtrate and washings were combined and permitted to stand for several days, resulting in the precipitation of more guanamine which was also removed by filtration. The crude, colored guanamine was recrystallized from a large amount of water, forming minute colorless needles with a melting point of 266° C., the yield being about 85%.

EXAMPLE 2

*α-Thienylguanamine*

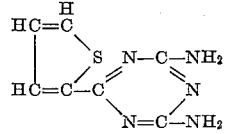

To a solution of 14.2 parts of the methyl ester of thiophene α-carboxylic acid in 25 parts of methanol was added a filtered solution of 12.0 parts of biguanide in 50 parts of methanol. After standing a day the precipitated guanamine was filtered, washed with a little methanol and air dried. Crystallization, with charcoaling, from a 50–50 mixture of the ethyl ether of ethylene glycol and water gave colorless, minute crystals. The yield of purified product was 86% of the theoretical.

EXAMPLE 3

*5-pyrimidinylguanamine*

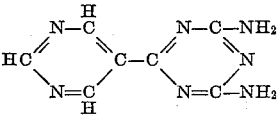

After dissolving 33.3 parts of biguanide in 100 parts of methanol, the solution was clarified by filtration and 41.4 parts of the methyl ester of pyrimidine-5-carboxylic acid added. To this solution was added a solution of 7 parts of sodium dissolved in 100 parts of methanol as a condensing agent. The following day the guanamine, which had separated from solution, was filtered, washed with methanol and air dried. Crystallization of the crude product from a large volume of the ethyl ether of ethylene glycol gave a 63% yield of fine, colorless crystals.

EXAMPLE 4

*4-N-phenylfuroguanamine*

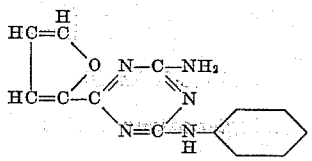

A solution of 88.5 parts of phenylbiguanide in 250 parts of the ethyl ether of ethyleneglycol was prepared and 74.2 parts of ethyl furoate added. The solution darkened on addition of the ester but by the following day the color had diminished and the light tan product was filtered, washed with cold ethyleneglycol monoethyl ether, and dried in an oven at 100°. Crystallization from a large volume of the ethyl ether of ethyleneglycol with the aid of decolorizing charcoal gave colorless, minute crystals. The yield was 58% of the theoretical but when the reaction was repeated in the presence of an equivalent quantity of the sodium salt of the ethyl ether of ethyleneglycol, the yield was increased to 74%.

These 5 and 6 membered heterocyclic groups may be condensed with one or more aryl groups or with one or more similar heterocyclic groups. Illustrative types of carboxylic acids containing such groups include for example:

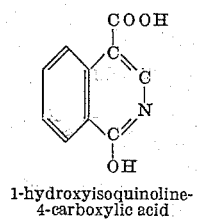 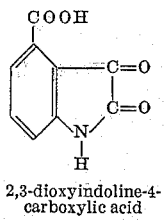

1-hydroxyisoquinoline-4-carboxylic acid    2,3-dioxyindoline-4-carboxylic acid

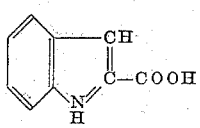 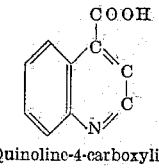

Indole-2-carboxylic acid    Quinoline-4-carboxylic acid

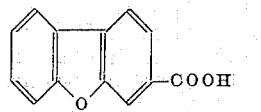

Diphenyleneoxide-2-carboxylic acid

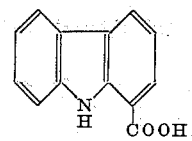

Carbazole-1-carboxylic acid

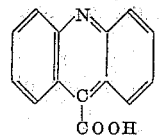

Acridine-9-carboxylic acid

Consequently, the expression "5 or 6 membered heterocyclic groups" as used in the present specification and claims is intended to include such groups when condensed with one or more aryl groups or with similar 5 membered groups. The 5 or 6 membered heterocyclic groups also may be substituted with aliphatic or aromatic radicals which are illustrated by the following examples:

EXAMPLE 5

*Furylacryloguanamine*

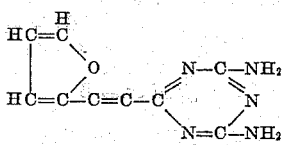

The procedure of Example 1 was followed except that 45 parts of biguanide was used and 85 parts of ethyl furylacrylate dissolved in 40 parts of methanol was substituted for the ethyl furoate. The crude furylacryloguanamine was purified by recrystallization from a mixture of 40% of the ethyl ether of ethylene glycol and 60% water, yielding minute colorless plates melting at 254° C. The yield was slightly under 85%.

EXAMPLE 6

*1-phenyl-pyrazolonyl-3-guanamine*

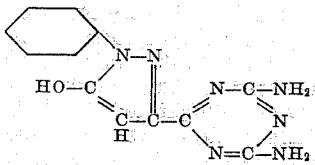

25 parts of ethyl 1-phenyl-3-pyrazolone carboxylate and 10 parts of biguanide were dissolved in 80 parts of methanol and clarified by filtration. Salt formation takes place, and appears to have a hydrotropic effect, increasing the solubility of the ester and biguanide so that a relatively small amount of methanol suffices as solvent. 2.3 parts of sodium dissolved in 80 parts of methanol was added as a condensing agent. The reaction mixture was allowed to stand and was then diluted with water and acidified with acetic acid. The precipitated guanamine was purified by redissolving in a 50–50 mixture of ethanol and the ethyl ether of ethylene glycol, precipitation being effected by dilution with a large volume of water. A tan colored amorphous solid having a melting point of 261° C. was obtained in a yield of about 15%.

EXAMPLE 7

*2-phenylcinchoninoguanamine*

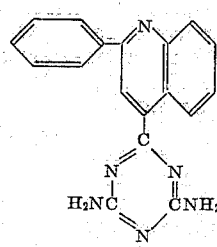

The procedure of Example 1 was followed but 10.1 parts of biguanide was dissolved in 80 parts of methanol and the ethylfuroate was replaced by 27.4 parts of methyl-2-phenylcinchoninate dissolved in 60 parts of methanol. The crude guanamine precipitate was purified by recrystallization from a mixture of one volume of the ethyl ether of ethylene glycol and two volumes of methanol. Colorless plates were obtained which melted at 240° C., the yield being about 65%.

The heterocyclic groups may be further substituted with various inorganic substituents such as hydroxy, halogen and the like groups. Solubilizing groups such as sulfonic or carboxylic radicals also may be added after the guanamine reaction if it is so desired. Typical examples of such compounds include for example the following:

EXAMPLE 8

*"Eosine" guanamine*

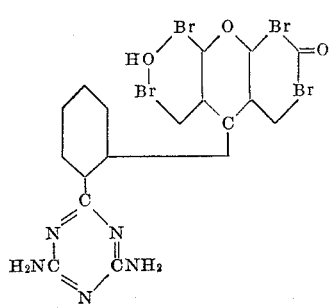

7.55 parts of biguanide was dissolved in 48 parts of methanol, the solution filtered, and 35 parts of the ethyl ester of eosine dissolved in 275 parts of the ethyl ether of ethylene glycol was added. The guanamine precipitated from the solution and was filtered and recrystallized by dissolving in boiling ethylene glycol and precipitating with a large volume of dioxane. The product consists of dense dark red crystals having a green fluorescence and melting at 275° C. The yield was over 65%.

EXAMPLE 9

*2,7-diethylamino-9-xanthenyl-o-benzoguanamine*

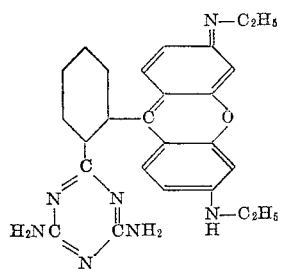

15 parts of biguanide were dissolved in 80 parts of methanol, the solution filtered, and added to a solution of 45 parts of the ethyl ester of rhodamine (2,7-diethylamino-9-xanthyl-o-benzoic acid) dissolved in 275 parts of the ethyl ether of ethylene glycol. An equivalent amount of sodium methoxide was added to liberate the base, sodium chloride being filtered off. The filtrate was allowed to stand until the guanamine separated out. The product was recovered by filtration and was purified by dissolving in boiling triethylene glycol and pouring into water. The product was a bright red amorphous powder, melting at 259° C. The yield was slightly under 85%.

The preceding examples have been concerned with heterocyclic groups containing one or two hetero atoms. In accordance with the procedure of the present invention the heterocyclic group also may be an additional triazinyl radical. The reaction, however, may not be quite as simple since an ester of a dibasic acid must be used and some of the intermediate compounds, for example the carboxy guanamines, are also insoluble and precipitate out as part of the product. Typical illustrations of these compounds containing the conjugated double bond system of the present invention are shown in the following examples:

EXAMPLE 10

*Ethylenediguanamine*

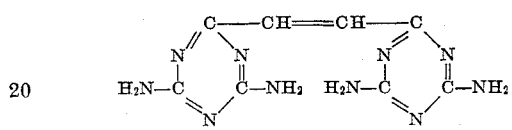

51 parts of biguanide were added to 36 parts of dimethyl fumarate dissolved in 400 parts of warm methanol. Product began to separate before all of the biguanide had dissolved. After standing about 12 hours the product was filtered from the solvent and washed with cold methanol. A mixture was obtained in about 75.6% yield. After purification about 14% of the diguanamine was obtained together with about 30% of β-carboxyacryloguanamine having the formula:

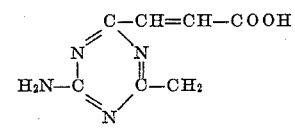

EXAMPLE 11

*Terephthaloguanamine*

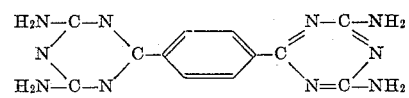

To 50 parts of biguanide dissolved in 300 parts of methanol was added 62 parts of dibutyl terephthalate, which was prepared by esterification of terephthalic acid with butanol. Product began to precipitate in a few minutes and on further standing the solid partially dissolved. The remaining solid amounting to about 38 parts was removed by filtration and extracted with about 3000 parts of hot 5% sulfuric acid and cooled. The crystalline sulfate salt was suspended in water and made slightly alkaline in order to dissolve the small amount of p-carboxybenzoguanamine. The yield of terephthaloguanamine which did not melt at 300° C. was 45%.

We claim:
1. Heterocyclic substituted guanamines having the formula

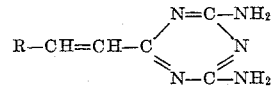

in which R is a substituent group containing a ring structure selected from the 5 and 6 membered heterocyclic rings in which oxygen is the only hetero atom, in which nitrogen is the only hetero atom, and in which sulfur is the only hetero atom; said substituent group containing a conjugated system of double bonds and being linked to the 2-carbon atom of the triazine residue by a carbon-to-carbon bond.
2. Furylacryloguanamine having the formula:
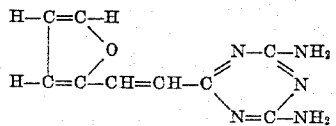
JACK THEO THURSTON.
DONALD WILLIAM KAISER.
REFERENCES CITED
The following references are of record in the file of this patent:
UNITED STATES PATENTS
| Number | Name | Date |
|---|---|---|
| 2,302,162 | Zerweck | Nov. 17, 1942 |
| 2,437,691 | Grun | Mar. 16, 1948 |
OTHER REFERENCES
Rackman: Annalen, 376, p. 180.